United States Patent Office 3,008,190
Patented Nov. 14, 1961

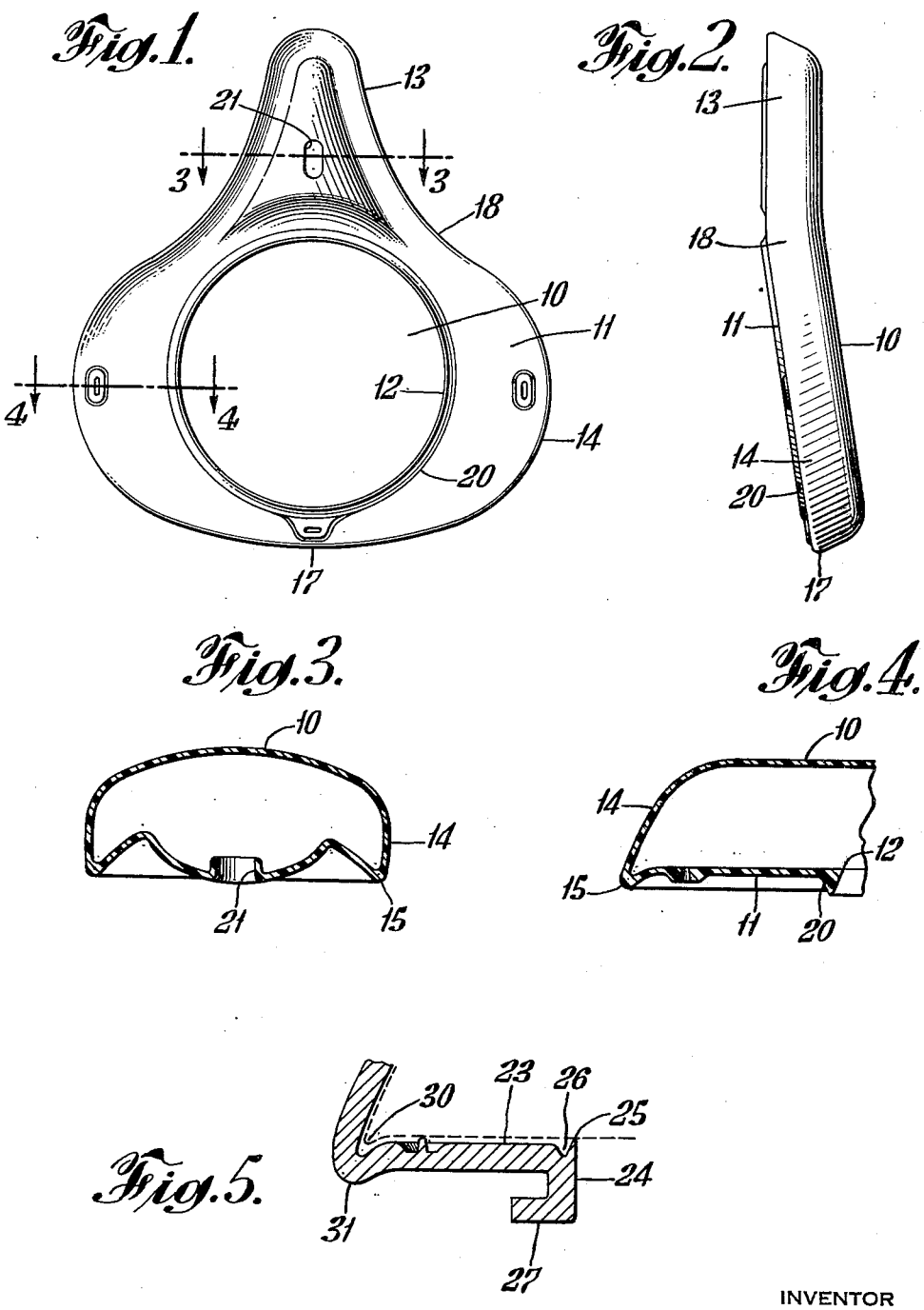

3,008,190
METHOD AND APPARATUS FOR FORMING CYCLE SADDLE COVERS
Robert H. Mesinger, Lakecrest Drive, Aunt Hack Ridge, Danbury, Conn.
Filed Aug. 16, 1955, Ser. No. 528,631
7 Claims. (Cl. 18—39)

This invention relates to a method of and apparatus for forming a hollow article and more particularly to a method and mould construction for rotation moulding a seamless unitary cover for enclosing the seat portion of a bicycle saddle.

The invention is particularly useful for providing an improved covering for saddle seats having a rigid base plate which may also have a layer of cushioning material thereon. The customary coverings of sheet material such as leather or coated fabric involve problems of forming and shaping the material around the double curved edge contours and of securing the material to the saddle top. This has been accomplished by various troublesome methods requiring the use of stitching all around the edges or the use of an extra steel bottom plate for clamping the leather edges to the main seat base. Difficulty is also caused by the shape of the saddle seat which has a generally triangular seat area with a forwardly extending narrow nose or pommel portion, it being difficult to form and stretch the leather or fabric around the double curved and concave contours.

It has been discovered that a top cover for saddles can be produced of a vinyl plastic material by slush moulding and curing a plastisol in unitary seamless form having the external contour of a bicycle saddle of the type made with a steel base plate on which a cushion pad is disposed, that such a top cover can be provided with a bottom skin that joins the downwardly depending sides all around and with a rounded opening therein smaller than the seat, and that such top cover can be made resilient enough to be forced over a saddle seat and fit it snugly and be securely retained on the seat. The successful application of such a cover on saddles depends not only on the properties of the material but upon the relative proportion of the hole in the bottom skin to the width of the seat which is very important.

This novel saddle seat cover may have any desired texture, color, is free of wrinkles, is very durable, does not shift or come loose and can be manufactured economically. Such saddle cover can also be used to replace worn out covers on used saddles.

Principal objects of the present invention are: to provide an improved method of and hollow moulds therefor for the rotation forming of a hollow article such as a saddle seat cover of unitary seamless flexible and durable plastic material which completely covers a saddle seat except a rounded area of the bottom which area is substantially smaller than the area of the seat bottom, which cover can be assembled on the seat by passing the seat through the opening in the bottom of the cover, and which can be manufactured at lower cost than conventional saddle coverings.

More specifically it is an object of the present invention to provide a process and a hollow mould structure for practicing the process to produce vinyl plastisol hollow articles such as saddle covers having increased thickness along the region where peripheral and bottom walls join, and to produce a thickened and rounded annular rim on the outer side of the bottom adjacent an opening therein and for forming a tear line at the inner edge of such rim.

Other objects and advantages of the invention will be apparent from the following description having reference to the drawing in which:

FIG. 1 is a bottom view of a seat cover made by a process according to the invention;
FIG. 2 is a side view of such article;
FIG. 3 is a view of a section taken on the line 3—3 of FIG. 1;
FIG. 4 is a fragmentary view of a section taken on the line 4—4 of FIG. 1; and
FIG. 5 is a fragmentary view on an enlarged scale of a mould corresponding to the lower part of FIG. 4 and showing the mould contour for forming the rim of the bottom opening and the corner contour.

In FIG. 1 the top 10 of the seat cover is seen only through a hole in the bottom layer or skin 11 which hole is defined by a rim 12. The hole may be oval or oblong provided with rounded outline but is preferably circular. The shape of the top is indicated by the outline having a generally triangular seat area with well-rounded sides and with a forwardly extending nose or pommel portion 13. The top cover extends downwardly to form the peripheral sides 14 the lower edges of which merge with the bottom skin 11 all around forming the peripheral corners 15. The material at these corners 15 is preferably thickened in order to provide reinforcement which increases the durability of the cover. This reinforcement insures against the possibility of a sharp steel edge of a metal base plate cutting the seat cover in the event of violent impact of the seat edges against a pavement. The seat cover is thus well adapted to be assembled about a saddle seat of the type that has a stamped sheet steel base plate with a cushion pad on its top and having downturned edges and without needing a special edge protection strip.

The rim 12 of the hole should not approach closer than a predetermined minimum distance from the peripheral walls 14 of the cover. Particularly at the rear center portion 17, such minimum distance should be about ½ inch and this distance may be between ½ and ¾ inch. The distance from the rim's nearest approach to the peripheral sides at 18 could be somewhat less or greater for example between ¼ inch and 1 inch. If the hole is made transversely oval, the corresponding distances can be greater. It is found that the transverse dimension of the hole rim to rim should be at least ½ of the widest width of the cover.

The rim 12 also has a reinforcing bead 20 which is formed during the moulding process. This bead, of rounded triangular or half round cross sectional shape as seen in FIG. 4, greatly strengthens the rim 12. After assembly of the cover on a saddle seat, the rim returns to its moulded shape and cooperates in securely holding the cover on the seat. The characteristic of cured vinyl plastisols to return to the moulded shape when released from a distorting force is particularly advantageous.

Since the bottom skin encloses the nose portion of the seat cover, it is preferable to provide a suitable hole 21 for the bolt or other means for fastening the front of the saddle seat supporting frame to the bottom of the nose portion of the seat. FIG. 3 shows the cross section through the opening 21 which is oval to fit bolts for different styles of frames. The rim of such hole also preferably has a reinforcing bead and is so shaped that the closing skin formed in the mould across the hole readily separates from the rim to leave the open hole.

The method of forming the bead 20 about the rim 12 and effecting easy separation from the rim of the skin of material that forms across the hole in the mould is made clearer by reference to FIG. 5 which shows the cross-sectional contour of the mould interior corresponding to the cross-section 4—4 of FIG. 4. The mould surface that forms the bottom skin portion 11 is shown at 23, the layer of plastisol being indicated by the broken line. The wall of the filling hole of the mould is designated 24 and this ends interiorly at a sharp acute angled ridge 25. Adjacent the ridge 25 and along the side thereof opposite the hole is a channel or groove 26 which fills with plastisol to a greater thickness than the portion 23 and thus forms the rim bead 20.

Over the sharp edge of ridge 25 the plastisol forms so very thinly that the center disk of plastisol is very easily torn loose from the rim 12. For forming the bead 21 of the small hole a similar mould construction is employed except that no removable cover is needed. The removable cover of the large hole is not shown but it is fitted to the mould nozzle flange 27 and contacts the surface 24.

The section FIG. 5 also shows the mould contour for forming the reinforcing thickness at the corner 15. It is formed by channelling or providing the inner surface of the mould at the junction of the peripheral wall and bottom producing walls with a small radius groove 30 so as to trap an extra thickness of material therein during rotation of the mould in the oven, and also by designing the contour of the mould for providing heat collecting means exteriorly of the mould opposite such corner. Such surface could be provided by an attached metal fin but is preferably effected by arranging the walls of the mould corner to include an angle substantially less than 90° as shown at 31. This causes the mould corner to heat quicker by focusing heat flow toward the corner from the walls, and thereby gel the plastisol faster at the corner so as to build greater thickness. Additional thickness control is obtained by coating the wall corner portions as required by a radiant heat absorbing coating.

To form a seat cover, a measured quantity of plastisol is poured into the preheated mould, the mould temperature being preferably between 130° to 175° F. The cover is placed on the filling opening and the mould is secured on the mould carrier of an oven that heats the mould while turning it over and over to distribute the plastisol on the interior of the mould. The heat first gels the plastisol when the mould reaches a temperature of 220° F. and then further heating cures the plastisol. After partly cooling the mould, removal of the mould cover generally tears off the plastisol that forms on the cover from the rim because of the thinness over the edge of ridge 25. With the mould cover off, the still-warm saddle cover can be pulled entirely out of the mould through the filling opening.

The plastisol material is preferably of a composition which initially gels at about 220° F., and the gelled skin then fuses and cures to its final state at a temperature of 350° F. The temperature of the oven and the time in the oven are adjusted so that curing is accomplished in a reasonable time. For example with an oven temperature only slightly over 350° F. about 20 minutes of heating is required. High oven temperatures for shortening the time involves the danger of deleteriously overheating parts of the product.

The plastisol material may be a vinyl resin dispersed in a medium of non-volatile liquid plasticizer which can be gelled by heat and cured into a tough elastomeric plastic. The cover so made has great toughness and greater abrasion resistance than leather and fabric materials customarily used.

After the cover is pulled from the mould it can be immediately assembled on a seat by pushing the nose of the seat into the nose portion of the cover through the bottom opening hole within rim 12. Then forcing one lateral side after the other of said cover over the corresponding lateral sides of the seat support. The nose portion of the saddle seat may have a projecting bolt or fastening means which is projected through the hole 21. The spring frame supports for the seat portion of the saddle will usually project from the bottom of the seat through the large hole and close to opposite sides of the rim 12. When the spring frame is clamped to the seat base, the bottom layer 11 of the nose portion will be clamped therebetween.

It is to be understood that the saddle cover according to this invention may be used as the original cover part of a saddle having a metal base plate with preferably a layer of padding material such as hair felt, sponge rubber, or the like on the upper surface of the plate and under the top cover, or that the saddle cover may be used as a repair or replacement item for mounting on and covering a saddle having a worn out original cover. For the latter, it is usually preferable to unfasten the front spring securing bolt, mount the new cover on the seat with the bolt extending through the opening 21 and then refastening the front spring in place.

Alternatively it is also contemplated that the cover according to the invention may be slightly modified by providing a slot in the bottom 11 extending from the opening 21 to the rim 12 and preferably with reinforcing beads along the slot. When so modified, the cover can be placed on an old saddle without unfastening any spring securing bolts, the slot accommodating the front spring frame portions. Preferably also the two sides of the slot may be secured together after assembly on the saddle by suitable cross ties or lacing.

It is intended to cover all changes and modifications of the invention herein described which fall within the spirit and scope of the invention.

What is claimed is:

1. A process of producing a cycle saddle cover having a generally triangular top portion with a nose portion at the forward end downwardly extending peripheral walls and a bottom portion joining the walls substantially all around at a peripheral edge portion which process comprises providing a hollow mould with inner walls having the reverse contour of the external surfaces of said saddle cover including peripheral wall producing and bottom producing walls, the bottom producing wall having a rounded opening adapted to be closed with a mould closure, effecting an increased thickness of the saddle cover along the region where the peripheral walls and bottom portion join by providing the inner surface of the mould at the junction of the peripheral wall and bottom producing walls with a small radius groove and arranging them to approach at an included angle of less than 90°; placing a desired amount of vinyl resin base plastisol in the mould; heating the mould in a rotation moulding oven while rotationally distributing the plastisol therein; effecting increased heating of the plastisol in said small radius groove to build greater thickness by the heat absorbing and concentrating effect of the acute angularity of said walls adjacent said small radius groove; heat curing the layer of plastisol in the mould, removing the mould closure and pulling out a completed seat cover from the mould having a substantially thickened peripheral edge portion.

2. Apparatus for producing a cycle seat cover having a generally triangular top portion with a nose portion at the forward narrow end, downwardly extending peripheral walls and a bottom wall joining the lower edge of the peripheral walls all around, said apparatus comprising a unitary hollow mould with inner walls corresponding to and having the reverse contour of the external surfaces of said seat cover including a bottom producing wall, a circular opening in said bottom producing wall defined by an outstanding rim, a mould closure cooperating with said rim to close the mould, a sharp acute angled ridge completely extending about said opening wall, and a continuous groove of small radius formed in the bottom producing wall and contiguous to said acute angled ridge on the side thereof opposite said opening so that when a measured quantity of a plastisol is rotation moulded in the closed mould, said groove will form a reinforced edge rim on a hole in the bottom of the resulting seat cover and said acute angled ridge will form a sharp groove dividing the skin within the rim from the edge rim.

3. Apparatus according to claim 2 in which the downwardly extending peripheral wall producing walls of the mould and the bottom wall producing wall of the mould approach each other at substantially less than 90° and join to form a rounded corner and a small radius channel along the inside for forming a reinforcing thickness of plastisol therein and for collecting and concentrating a greater heating effect along such corner when the mould is rotationally heated in an oven.

4. Apparatus for producing a cycle seat cover having a generally triangular top portion with a nose portion at the forward narrow end, downwardly extending peripheral walls and a bottom wall joining the lower edge of the peripheral walls all around, said apparatus comprising a unitary hollow mould with inner walls corresponding to and having the reverse contour of the external surfaces of said seat cover including a bottom producing wall, the downwardly extending peripheral wall producing walls of the mould and the bottom wall producing wall of the mould approaching each other at substantially less than 90° and joining to form a rounded corner and a small radius channel along the inside for forming a reinforcing thickness of plastisol therein and for collecting and concentrating a greater heating effect along such corner.

5. A process of producing a cycle seat cover having a generally triangular top portion with a nose portion at the forward narrow end, downwardly extending peripheral walls and a bottom skin joining the lower edge of said walls all around which process comprises providing a hollow mould with inner walls having the reverse contour of the external surfaces of said seat cover including a bottom producing wall and having a round opening in said bottom producing wall bounded by an upstanding flange and closed by a removable closure; rotational moulding a measured quantity of vinyl resin base plastisol within the mould while subjecting the mould to oven heating to gel and cure a desired thickness of plastisol skin on the inner walls of the mould; forming an opening defining sharp groove in the bottom skin by providing a sharp acute angled ridge completely extending about the opening and projecting inwardly of the bottom producing wall a distance above the level of the outside wall of said bottom at least equal to the thickness of said wall; forming a thickened and rounded continuous rim on the outer side of said bottom adjacent said opening producing groove by providing a continuous round bottomed channel in the bottom producing wall of said mould adjacent said acute angled ridge on the side thereof opposite said opening; after the material is cured and cooled, pulling off the disk of skin within said rim by tearing it away along said groove to form said bottom opening with a thickened annular rim.

6. Apparatus for producing a hollow article having a top wall portion, downwardly extending peripheral walls and a bottom wall joining the lower edges of the peripheral walls all around, said apparatus comprising a unitary hollow mould with inner walls corresponding to and having the reverse contour of the external surfaces of said hollow article including a bottom producing wall, a circular opening in said bottom producing wall defined by an outstanding rim, a mould closure cooperating with said rim to close the mould, a sharp acute angled ridge completely extending about said opening and projecting inwardly from said bottom producing wall, and a rounded continuous groove of small radius formed in the bottom producing wall and continuous to said acute angled ridge on the side thereof opposite said opening so that when a measured quantity of a plastisol is rotation moulded in the closed mould, said groove will form a reinforced edge rim on a hole in the bottom of the resulting hollow article and said sharp ridge will form a sharp groove dividing the skin within said rim from the edge rim.

7. Apparatus for producing a hollow article having a top wall portion, downwardly extending peripheral walls and a bottom wall joining the lower edges of the peripheral walls all around, said apparatus comprising a unitary hollow mould with inner walls corresponding to and having the reverse contour of the external surfaces of said hollow article including a bottom producing wall, the downwardly extending peripheral wall producing walls of the mould and the bottom wall producing wall of the mould approaching each other at substantially less than 90° and joining to form a rounded corner and a small radius channel joining along the inside for forming a reinforcing thickness of plastisol therein and for collecting and concentrating a greater heating effect along such corner.

References Cited in the file of this patent

UNITED STATES PATENTS

| 2,011,842 | Brandt | Aug. 20, 1935 |
| 2,093,906 | Brandt | Sept. 21, 1937 |
| 2,254,685 | Jackson | Sept. 2, 1941 |
| 2,332,847 | Franke | Oct. 26, 1943 |
| 2,588,571 | Porter | Mar. 11, 1952 |
| 2,629,134 | Molitor | Feb. 24, 1953 |
| 2,730,765 | Crafton et al. | Jan. 17, 1956 |
| 2,763,031 | Rekettye | Sept. 18, 1956 |
| 2,817,116 | Miller et al. | Dec. 24, 1957 |
| 2,862,232 | Rekettye | Dec. 2, 1958 |
| 2,923,032 | Miller et al. | Feb. 2, 1960 |

OTHER REFERENCES

Magazine article "Plastics Engineering," October 1950, "Slush Molding Vinyl Plastics," pp. 102–104 by Eugene B. Greenspun.